(12) United States Patent
Gerber et al.

(10) Patent No.: US 10,604,157 B2
(45) Date of Patent: Mar. 31, 2020

(54) METHOD AND APPARATUS FOR TESTING A DRIVER ASSISTANCE SYSTEM

(71) Applicant: FORD GLOBAL TECHNOLOGIES, LLC, Dearborn, MI (US)

(72) Inventors: Nils Gerber, Overath (DE); Tobias Fraatz, Cologne (DE); Franziskus Bauer, Huerth (DE); Sascha Haase, Wermelskirchen (DE); Sebastian Stauff, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 15/712,841

(22) Filed: Sep. 22, 2017

(65) Prior Publication Data
US 2018/0093674 A1    Apr. 5, 2018

(30) Foreign Application Priority Data

Sep. 30, 2016  (DE) .................. 10 2016 219 031

(51) Int. Cl.
| | | |
|---|---|---|
| *G07C 5/00* | (2006.01) | |
| *G06T 15/20* | (2011.01) | |
| *G05D 1/00* | (2006.01) | |
| *B60W 30/00* | (2006.01) | |
| *B60W 40/00* | (2006.01) | |

(Continued)

(52) U.S. Cl.
CPC .......... *B60W 50/04* (2013.01); *B60W 50/14* (2013.01); *G06T 15/20* (2013.01); *B60W 2420/42* (2013.01); *B60Y 2304/09* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 2015/0149031 | A1* | 5/2015 | Pfister ................ | G01M 17/007 |
| | | | | 701/33.4 |
| 2016/0210775 | A1* | 7/2016 | Alaniz ................ | G05D 1/0088 |

(Continued)

FOREIGN PATENT DOCUMENTS

| | | |
|---|---|---|
| DE | 102006060553 A1 | 6/2008 |
| DE | 102012008117 A1 | 10/2013 |

OTHER PUBLICATIONS

Steffen Schmidt et al., Vehicle-in-the-Loop—New Test Method for Real-Time Testing, Fusing Real Vehicles With the Virtual World, IPG Automotive, GmbH, Germany, 8 pgs.

*Primary Examiner* — Adam D Tissot
(74) *Attorney, Agent, or Firm* — Brooks Kushman P.C.; Frank Lollo

(57) ABSTRACT

The disclosure relates to a method and an apparatus that tests a driver assistance system. In a method that tests a driver assistance system in a vehicle, the vehicle includes at least one visual sensor, and the driver assistance system initiates a vehicle reaction based on input data provided by the visual sensor. A provision of the input data is modified using at least one virtual object. In this ease, this modification is carried out by virtue of an image captured by the visual sensor, or scenery captured by the visual sensor being enriched using the at least one virtual object before being captured by the visual sensor.

16 Claims, 2 Drawing Sheets

(51) Int. Cl.
*B60W 50/04* (2006.01)
*B60W 50/14* (2020.01)

(56) References Cited

U.S. PATENT DOCUMENTS

2017/0269681 A1* 9/2017 Andersson ............. G09B 9/042
2017/0285639 A1* 10/2017 Jones ................... B60W 30/08

* cited by examiner

METHOD AND APPARATUS FOR TESTING A DRIVER ASSISTANCE SYSTEM

CROSS-REFERENCE TO RELATED APPLICATIONS

This application claims foreign priority benefits under 35 U.S.C. § 119(a)-(d) to DE Application 10 2016 219 031.8 filed Sep. 30, 2016, which is hereby incorporated by reference in its entirety.

TECHNICAL FIELD

The present disclosure relates to a method and an apparatus to test a driver assistance system.

BACKGROUND

In active driver assistance systems, for example lane detection and lane change warning systems, traffic sign recognition systems or emergency braking systems, visual sensors, for example cameras, are used to provide input data for the relevant systems. The visual input data are used in various algorithms that initiate corresponding reactions of the vehicle, for example vehicle steering, vehicle braking or feedback from a human-machine interface (HMI).

In order to test such active driver assistance systems, it is necessary to operate the accordingly equipped vehicles under real conditions of use, in which case an interaction with real road markings, traffic signs and third-party vehicles is required, in particular. This results in a considerable outlay and in a high degree of complexity of the respective test procedures. Only performing tests on a test bench (for example in "hardware-in-the-loop" test benches) proves to be insufficient since the entire vehicle system, its interaction with the environment (for example under different weather conditions such as sun or rain or in the case of different road surfaces) and the interaction with the driver must be taken into account for a reliable test of the driver assistance system.

In the case of a lane departure assistant, a test under all possible scenarios in the real world or on a test track with all special road markings is required, in principle, for example.

In the case of traffic sign recognition, speed limit signs are captured using a front camera and the respectively prescribed maximum speeds are identified, whereupon further actions of the vehicle can be initiated. In principle, such a system has to be tested for all conventional traffic signs, which can be carried out either by performing worldwide test drives, or using a test track provided with all conventional traffic signs.

In the case of emergency braking systems, objects on a route ahead of the vehicle are detected, and the brakes of the vehicle are activated in order to avoid, or at least reduce, a collision. Such systems are typically tested on test tracks using particular obstacles, for example foam blocks having the shape of a vehicle, such obstacles being either static or (if movable objects are implemented) complex to produce and control.

U.S. 2015/0149031 A1 discloses, inter alia, a method for testing a vehicle, a test control unit generating or playing back a virtual world which contains both a virtual vehicle state and a virtual vehicle environment. In this case, a driving state actuator generates the instantaneous vehicle state in the virtual world and the instantaneous vehicle environment by introducing additional forces or torques into the real vehicle, with the result that the real vehicle on the real test track experiences the vehicle state and the vehicle environment from the virtual world.

SUMMARY

An object of the present disclosure is to provide a method and an apparatus that tests a driver assistance system, which makes it possible to check a function of the driver assistance system in a reproducible and comprehensive manner with a reduced test outlay.

In a method for testing a driver assistance system in a vehicle, the vehicle having at least one visual sensor, and the driver assistance system initiating a vehicle reaction on the basis of input data provided by the visual sensor, the provision of the input data is modified using at least one virtual object. In this case, the provision of the input data is modified by virtue of an image captured by the visual sensor or scenery captured by the visual sensor and enriched using the at least one virtual object before being captured by the visual sensor.

In the sense of the present application, the designation "driver assistance system" should be understood as including both vehicle safety systems and vehicle information and signaling systems as well as comfort systems. In particular, in addition to lane detection and lane change warning systems, traffic sign recognition systems or emergency braking systems, systems that display, for example, a parking space that has been found in a camera-assisted manner, an entrance to a parking garage or the like to the driver via a head-up display are also included. The term "vehicle reaction," therefore, also includes transmission of information, which is carried out by the vehicle (for example display of a traffic sign, parking space etc.).

The disclosure is based on the concept, in particular, of enriching a field-of-view of one or more visual sensors used in a driver assistance system using the principle of "augmented reality". For this purpose, a suitable apparatus can be placed in the field-of-view of the visual sensor or the camera, in particular, in order to add virtual objects, for example road markings, traffic signs or virtual vehicles, to the image perceived or captured by the camera.

As a result, the disclosure makes it possible to check driver assistance systems in a particularly cost-effective and time-saving manner, in which case it is possible to carry out testing with little personnel expenditure, in a relatively short time, with a lower infrastructure requirement and with a lower traffic requirement. Furthermore, it is possible, in principle, to test an unlimited variety of virtual objects since restrictions, like when using foam objects for instance, do not exist. In addition, the method according to the disclosure also enables a more comprehensive and more varied interaction with objects than is the case during a test in real vehicle environments.

According to one embodiment, the at least one virtual object is placed in the field-of-view of the visual sensor.

According to one embodiment, data relating to an actual vehicle environment are linked to data relating to the at least one virtual object.

In one exemplary embodiment, a lane departure assistance system can be tested on a test track without existing road markings. In this case, the field-of-view of a front camera of a relevant vehicle is enriched with virtual road markings. The front camera captures accordingly added road markings, with the result that the vehicle can accordingly react thereto.

In another exemplary embodiment, an emergency braking system can also be tested on a test track using the method according to the disclosure. In this case, a virtual object or obstacle is placed in the field-of-view of a front camera of a respective vehicle. The camera will capture the relevant object, with the result that the vehicle reacts accordingly. In this case, both movable and static obstacles, or objects, can be generated and placed in the field-of-view of the front camera of the respective vehicle.

The disclosure also relates to an apparatus configured to test a driver assistance system in a vehicle. The vehicle having at least one visual sensor, and the driver assistance system being able to initiate a vehicle reaction on the basis of input data provided by the visual sensor. The apparatus being configured to carry out a method having the features described above. With respect to advantages and preferred configurations of the apparatus, reference is made to the statements above in connection with the method according to the disclosure.

The disclosure will be explained in more detail below on the basis of exemplary embodiments with reference to the accompanying Figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
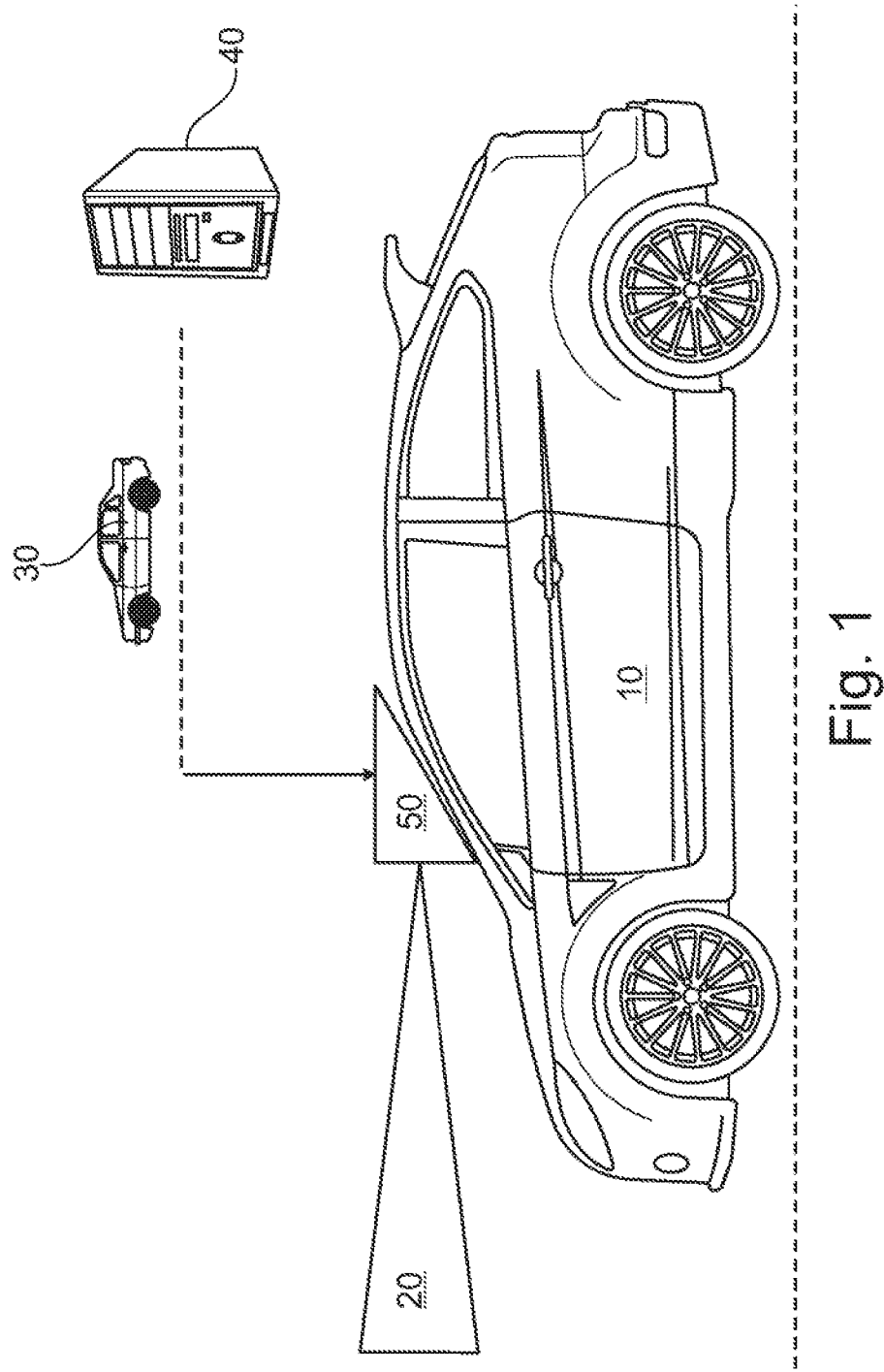
FIG. 1 shows, in a merely schematic illustration, an overview of components of the apparatus according to the disclosure in accordance with one embodiment.
Figure 2:
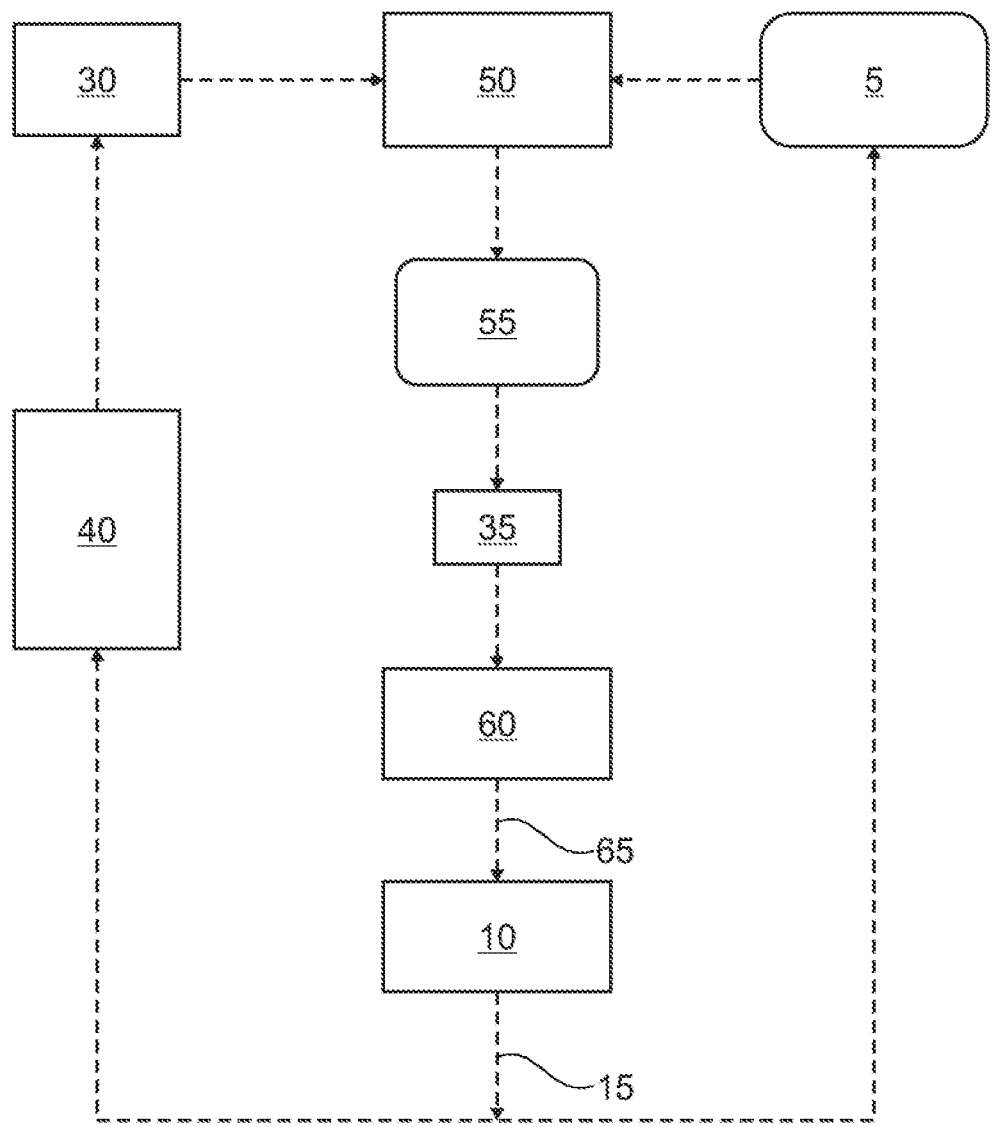
FIG. 2 shows a diagram that explains a method of operation of the apparatus, and possible signal flow when carrying out the method according to the disclosure.

In this case, it is assumed that a vehicle designated "10" in FIGS. 1 and 2 is equipped with an active driver assistance system, which may be, for example, a lane departure assistant, a traffic sign recognition device or an emergency braking system. The input data for this driver assistance system are provided, inter alia, by at least one visual sensor 35, the field-of-view of which is designated "20" in FIG. 1.

An essential element of the apparatus according to the disclosure is a combination unit (combiner) 50, which, according to FIG. 2, combines or links at least one virtual object 30 or the data describing such an object 30 with data 5 describing an actual vehicle environment ("real world") and, as a result of this linking, generates an accordingly enriched or augmented image 55, which is supplied to the visual sensor 35, or the camera 35.

The at least one virtual object 30 may be, for example, a virtual traffic sign, a virtual third-party vehicle, a virtual lane or any desired other virtual object.

The active driver assistance system 60 is controlled on the basis of the data provided by the visual sensor 35, which driver assistance system generates corresponding control signals (for example that brake, accelerate and/or steer the vehicle 10) and transmits the corresponding control signals to corresponding actuators of the vehicle 10.

In FIGS. 1 and 2, "40" is used to designate an apparatus (for example a computer-based apparatus) configured to provide data describing the at least one virtual object 30, which is typically carried out via simulation. Numeral "15" is used to designate current vehicle data (such as vehicle position, vehicle speed and vehicle acceleration) that are supplied both to the device 40, and (in conjunction with the data 5 describing the actual vehicle environment or the "real world") combiner 50.

The data describing the at least one virtual object 30 can be linked to the data 5 describing the actual vehicle environment ("real world") according to the disclosure in different ways. On the one hand, a virtual object image can be placed in a field-of-view of the visual sensor 35, or a see-through display or an optical combiner can be used.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for testing a driver assistance system in a vehicle comprising:
   linking at least one virtual object with actual vehicle environment data via a combiner unit;
   generating an enriched image using the at least one virtual object and the actual vehicle environment data;
   displaying the enriched image on a see-through display positioned within a field-of-view of a camera on-board the vehicle;
   capturing the enriched image using the camera as input data indicative of an image or scenery outside of the vehicle;
   transmitting the input data from the camera to the driver assistance system; and
   initiating a vehicle reaction using the driver assistance system based on the input data by generating a control signal and transmitting the control signal to a corresponding vehicle actuator.

2. The method as claimed in claim 1 further comprising linking actual vehicle environment data to the input data after enriching.

3. The method as claimed in claim 1, wherein the at least one virtual object is indicative of a virtual road marking.

4. The method as claimed in claim 1, wherein the at least one virtual object is indicative of a virtual third-party vehicle.

5. The method as claimed in claim 1, wherein the at least one virtual object is indicative of a virtual traffic sign.

6. A driver assistance system for a vehicle, comprising:
   a camera positioned on-board the vehicle and configured to capture an image indicative of scenery within a field-of-view of the camera and outside the vehicle;
   a combiner unit configured to (i) link at least one virtual object with actual vehicle environment data, (ii) generate an enriched image using the at least one virtual object and the actual vehicle environment data, and (iii) display the enriched image on a see-through display positioned within the field-of-view of the camera; and
   a control module in communication with the camera and the combiner unit, the control module configured to, in response to receiving input data from the camera representative of the enriched image, initiate a vehicle reaction by generating a control signal and transmitting the control signal to a corresponding vehicle actuator.

7. The driver assistance system as claimed in claim 6, wherein the at least one virtual object is indicative of a road marking.

8. The driver assistance system as claimed in claim 6, wherein the at least one virtual object is indicative of a third-party vehicle.

9. The driver assistance system as claimed in claim 6, wherein the at least one virtual object is indicative of a traffic sign.

10. A vehicle comprising:
    at least one vehicle actuator configured to brake, accelerate and/or steer the vehicle;
    a camera disposed on an exterior of the vehicle, the camera configured to generate input data indicative of an image of scenery within an environment outside of the vehicle and within a field-of-view of the camera;
    a combiner unit configured to (i) link at least one virtual object with actual vehicle environment data, (ii) generate an enriched image using the at least one virtual object and the actual vehicle environment data, and (iii) display the enriched image within the field-of-view of the camera;
    a see-through display positioned within the field-of-view of the camera, wherein the combiner unit is configured to display the enriched image on the see-through display; and
    a control module in communication with the camera, the combiner unit, and the at least one vehicle actuator, the control module configured to, in response to receiving input data from the camera representative of the enriched image, initiate a reaction to the input data by generating a control signal and transmitting the control signal to the at least one vehicle actuator.

11. The vehicle as claimed in claim 10, wherein the virtual object is indicative of a road marking.

12. The vehicle as claimed in claim 11 further comprising a second virtual object indicative of a third-party vehicle, wherein the combiner unit is further configured to generate the enriched image with the virtual objects.

13. The vehicle as claimed in claim 12 further comprising a third virtual object indicative of a traffic sign, wherein the combiner unit is further configured to generate the enriched image with the virtual objects.

14. The method as claimed in claim 1, wherein the vehicle reaction is initiated to brake, accelerate and/or steer the vehicle in response to the input data.

15. The method as claimed in claim 1 further comprising generating the at least one virtual object via a computer via simulation.

16. The vehicle as claimed in claim 10 further comprising a computer in communication with the combiner unit, the computer configured to generate the at least one virtual object via simulation.

* * * * *